(12) United States Patent
Aoki

(10) Patent No.: US 7,501,109 B2
(45) Date of Patent: Mar. 10, 2009

(54) METHOD FOR MANUFACTURING AN ELECTRIC CONDUCTOR FOR ELECTRODES

(75) Inventor: Katsuji Aoki, Itami (JP)

(73) Assignee: Fuji Corporation, Hyogo (JP)

( * ) Notice: Subject to any disclaimer, the term of this patent is extended or adjusted under 35 U.S.C. 154(b) by 12 days.

(21) Appl. No.: 11/666,897

(22) PCT Filed: Oct. 14, 2005

(86) PCT No.: PCT/JP2005/018948

§ 371 (c)(1),
(2), (4) Date: May 2, 2007

(87) PCT Pub. No.: WO2006/049005

PCT Pub. Date: May 11, 2006

(65) Prior Publication Data

US 2008/0131678 A1    Jun. 5, 2008

(30) Foreign Application Priority Data

Nov. 4, 2004    (JP) .............................. 2004-320092

(51) Int. Cl.
*D01F 9/12*    (2006.01)

(52) U.S. Cl. ...................................... 423/447.1; 445/46
(58) Field of Classification Search .............. 423/447.1; 445/46

See application file for complete search history.

(56) References Cited

FOREIGN PATENT DOCUMENTS

| JP | 1-253163 | 10/1989 |
|---|---|---|
| JP | 3-219566 | 9/1991 |
| JP | 7-254432 | 10/1995 |
| JP | 2000-306587 | 11/2000 |
| WO | WO 01/04980 A1 | 1/2001 |

*Primary Examiner*—Edward M Johnson
(74) *Attorney, Agent, or Firm*—Kirchstein, et al.

(57) ABSTRACT

An electric conductor for electrodes composed of a carbon fiber felt has low felt density and a great number of pores so that it can retain a cathodic reactant such as molten sulphur. The electric conductor is manufactured by forming a lap by mixing and locking together relatively large amount of a flame-resistance fiber and relatively small amount of an organic fiber, orienting fibers of the layered lap in the direction of a thickness by needle-punching to felt the layered lap and baking the felt thus obtained at 1100 to 2000° C. whereby the flame-resistant fiber is carbonized and then the organic fiber is so incinerated that solid thereof is almost transpired.

7 Claims, 1 Drawing Sheet

METHOD FOR MANUFACTURING AN ELECTRIC CONDUCTOR FOR ELECTRODES

TECHNICAL FIELD

The present invention relates to a felt precursor of an electric conductor for electrodes, which can retain a large amount of a cathodic reactant such as melted sulfur by having pluralities of pores, and a method for preparing the electric conductor composed of a felt of made a carbon fiber having low density.

BACKGROUND ART

Out of consideration for environmental pollution, there has been now requested clean energy in which exhaust of carbon dioxide is low as for usage of electricity. A power storage system has been put to practical use, in which electric power generated during low power consumption is charged in a secondary cell or battery and is consumed when necessary, and also the development of a fuel cell has been advanced promptly. The fuel cell is a system that allows hydrogen extracted from natural gas or the like to react electrochemically with atmospheric oxygen to generate electricity. The heat of about 100° C. wasted during electricity generation can be used for hot-water supply and/or heating. In the fuel cell, phosphate solution type is suitable for small-scale private power generation. In a secondary battery, a sodium-sulfur cell (Na—S battery) is generally applied to power storage. In the case of the sodium-sulfur cell, a carbon material for supplying electron to sulfur is used as a cathode. Since this carbon material has generally high electronic conductivity, is inert chemically and does not react with other material, it is suitable for auxiliary electrodes.

It is desirable that internal resistance of the secondary battery is low and charge and discharge efficiency thereof is high, for the purpose of power storage. In order to improve charge and discharge efficiency of the sodium-sulfur battery, β-alumina solid electrolyte itself must be brought for low resistance, and as for a cathode, it is necessary to lower contact resistance between several materials and decrease internal resistance for promoting a reaction of an active material within the cathode. As a conductor for electrodes, a material that can contain and retain molten sulphur is also desirable, whose strength is high and electric resistance is low. The felt of a carbon fiber is generally used from this respect. In JP-H08-130032, for example, a felt made of PAN carbon fiber is employed and α-alumina powder is scattered on the surface of the felt of a carbon fiber to improve the electric conductivity and decrease contact resistance between several materials. The felt made of a PAN carbon fiber has limitations on improvement of cell performance as a electric conductor when being applied alone, and also it is not enough to improve the performance in the felt even if α-alumina powder is scattered.

On the contrary, JP-H11-158737, JP-2000-306587 and JP-2001-15369 disclosed a felt of a flame-resistant fiber turned to a carbon fiber felt by high-temperature baking, reforming in the precursor or the flame-resistant fiber being carried out, instead of reforming in the carbon fiber felt. In JP-H11-158737, a flame-resistant fiber only or the mixture of a flame-resistant fiber is turned to a carbon fiber at a high carbonization yield by carbonizing it at maximum temperature 1100° C. or high. In JP-2000-306587, a felt of a flame-resistant fiber is minutely punched with needles from the one or both surface thereof to achieve degree of fiber orientation of 20% or more in the direction of a thickness, thereby the carbon fiber felt thus obtained gets less problem of blocking as compared with a standard carbon fiber felt and thus has necessary conductivity and a high heat-resistance as an anode conductor. In JP-2001-115369, a preliminary felt is formed by rough needle-punching of a flame-resistant fiber and then web is layered on one or both sides of the felt, which is punched with needles to obtain a felt of a carbon fiber, of which both bulk density and mechanical strength are high, fiber orientation in the direction of a thickness increases greatly in degree and electrical conduction property is excellent.

[Cited Reference 1] JP-A2-H08-130032
[Cited Reference 2] JP-A2-H11-158737
[Cited Reference 3] JP-A2-2000-306587
[Cited Reference 4] JP-A2-2001-115369

DISCLOSURE OF THE INVENTION

Problems to be Solved by the Invention

So as to manufacture an electric conductor, the felt precursor, i.e., the felt of a flame-resistant fiber is much more flexible than a felt of a carbon fiber. Accordingly, the desired needle-punching treatment can be approximately carried out, fibers of the felt is oriented in the direction of a thickness thereof, and thus somewhat bulky felt of a carbon fiber can be obtained by means of the above-mentioned several processes. However, a flame-resistant fiber finished settling down considerably in reality by minutely needle-punching. Thus the carbon fiber felt has limitations on density reduction and cannot keep away from increase of the felt density. As this result, these electric conductors inhibit the reaction of an active material because internal resistance in the anode is still considerably high when applying to a sodium-sulfur cell. It is therefore not enough to achieve impregnation and holding of molten sulphur or cathodic reactant.

The present invention is proposed to improve the problem above-mentioned concerning a conventional electric conductor for electrodes. It is an object of this invention to provide a felt precursor of an electric conductor for electrodes, in which quantity used of a comparatively expensive flame-resistant fiber is reduced and the baking efficiency rises in percentage.

Another object of the present invention is to provide a method for manufacturing the electric conductor for electrodes, which has less felt density and larger number of pores as compared with a conventional or standard carbon fiber

Means for Solving the Problem

A method for manufacturing an electric conductor according to the present invention comprises forming a lap by mixing and locking together relatively large amount of a flame-resistant fiber and relatively small amount of an organic fiber and orienting fibers of the layered lap in the direction of a thickness by needle-punching to felt the layered lap. By baking the felt thus obtained at 1100 to 2000° C., subsequently, the flame-resistant fiber is carbonized and the organic fiber is so incinerated that solid of the organic fiber is almost transpired, the felt is voided of the organic fiber and the felt density lowers to yield the low-density electric conductor. In the present invention, a felt density of the electric conductor is desirably 0.065 to 0.107 g/cm$^3$, more preferably 0.077 to 0.100 g/cm$^3$.

A felt precursor according to the present invention is applied to baking it to the low-density electric conductor with a felt density of 0.065 to 0.107 g/cm$^3$ and an electric resistance of 1 to 500 mΩ. The felt precursor of the present invention comprises forming a lap by mixing and locking 70 to 98% in weight of a flame-resistant fiber and 2 to 30% in weight of an organic fiber and orienting fibers of the layered lap in the direction of a thickness by needle-punching minutely from one or both sides thereof. The felt precursor has a density of 0.120 to 0.155 g/cm$^3$ and a degree of fiber orientation of 30% or more in the direction of a thickness. In the felt precursor, there may be preferably mixed 90 to 95% in weight of the flame-resistant fiber and 5 to 10% in weight of the organic fiber.

In the felt precursor of the present invention, the flame-resistant fiber may be a PAN (polyacrylonitrile) fiber and the organic fiber may be a polyolefin, polyamide, polyester fiber or the like. In this case, the organic fiber such as a polypropylene fiber has desirably a fineness of 3 to 22 dtex (decitex), more preferably 6 to 15 dtax. The length of the organic fiber is desirably between 5 mm and the length of the flame-resistant fiber, more preferably 10 mm and the length subtracting 10 mm from the length of the flame-resistant fiber.

Illustrating the present invention with the drawings, an electric conductor 1 (FIG. 1) for electrodes according to the present invention is substantially a felt of a carbon fiber, which may be manufactured by baking a felt precursor 2 at 1100 to 2000° C. The electric conductor 1 is useful for a secondary cell or battery such as a sodium-sulfur cell 3 (FIG. 3), a fuel cell or the like. The fuel cell includes aqueous solution of phosphate type having generating efficiency of 40%, inside reforming fused carbonate type having generating efficiency of 50%, fixed electrolyte type for large-scale power source or the like.

The sodium-sulfur cell 3 exemplifying the secondary cell is mainly applied to an electric power storage system, which is provided with a tubular anodic container 5 and solid electrolyte tube 6 made of β-alumina. The solid electrolyte tube 6 is cylindrical in shape and has selective permeability to sodium ion. A reservoir 7 for molten metal sodium whose bottom is open is disposed within the solid electrolyte tube 6. The electric conductor 1 constituting an anodic conductive body 9 is impregnated with molten sulfur, which is curved cylindrically and arranged between the outer surface of the solid electrolyte tube 6 and the inner surface of the anodic container 5.

In the sodium-sulfur cell 3, during discharge, molten metal sodium emits electrons to become sodium ions and then the sodium ions permeate the solid electrolyte tube 6 to transfer into the side of the anode in which the sodium ions react with sulfur and electrons carried through an outer circuit to produce sodium polysulfide in the conductor 1. Consequently, the cell 3 generates voltage of about 2 volt. During charge, also, sodium polysulfide splits into sodium ions, sulfur, and then the sodium ions permeate the solid electrolyte tube 6 to transfer into the side of the cathode in which the sodium ions receive electrons to return to metal sodium. But not shown, for example, a large number of the sodium-sulfur cells 3 is built in a prismatic battery module or the like so that it generates output power on 4 kw. Twenty-five of the battery modules are arranged in 5 columns and 5 lines, which constitutes a power storage system.

So as to manufacture the felt precursor 2 as shown in FIG. 2, a lap may be formed by mixing and locking relatively large amount of flame-resistance fiber 8 and relatively small amount of organic fiber 10 and fibers of a thickness are oriented in the direction of a thickness by minute needle-punching to felt the layered lap. The lap contains 70 to 98% in weight of the flame-resistant fiber and 2 to 30% in weight of the organic fiber, preferably 90 to 95% in weight of the flame-resistant fiber and 5 to 10% in weight of the organic fiber. It is difficult to spread uniformly both fibers when the organic fiber is less than 2% in weight. When the organic fiber is over 30% in weight, the baking efficiency of the felt falls In the felt precursor 2, the flame-resistant fiber 8 is preferably a standard PAN fiber. The flame-resistant fiber 8 may be a precursor for producing a carbon fiber, which is designated as a blackening fiber or carbon pre-oxide fiber. The flame-resistant fiber is resistant to fire or is heat-stabilized by ladder-polymerization together with formation of naphthyridine ring basically. Physical properties of the flame-resistant fiber 8 is generally a density of 1.3 to 1.5 g/cm$^3$, a tensile strength of 1.0 g/dtex or more, an elongation of 10% or more, a fineness of 1.5 to 4.0 dtex and a crimping rate of 8% or more. When the flame-resistant fiber has such physical properties, it is possible to prepare the electric conductor with low internal resistance after mixing relatively small amount of the organic fiber 10, needle-punching and baking.

On the other hand, relatively small amount of the organic fiber 10 may be a polyolefin, polyamide or polyester fiber. The organic fiber 10 is preferably a polyolefin fiber for the reason that it is easily baked and has small residue after baking, more preferably a polypropylene fiber because of easy felting. In the case of a polypropylene fiber, a fineness of the organic fiber 10 is desirably 3 to 22 dtax, more preferably 5 to 15 dtax. When a fineness of the fiber 10 is less than 3 dtax, the obtained felt settles down easily and it is difficult to secure enough number and volume of pores for the conductor. When a fineness thereof is more than 22 dtax, the volume of pores is irregularly within the conductor.

The length of the organic fiber 10 is desirably between 5 mm and the length of the flame-resistant fiber, more preferably 10 mm and the length subtracting 10 mm from the length of the flame-resistant fiber. When the length of the fiber 10 is less than 5 mm, it is not locked with the flame-resistant fiber 8 and falls off the felt. When the length thereof is more than that of the flame-resistant fiber, the obtained felt settles down because of too much locking of the fibers, and therefore it is insufficient to decrease the felt density.

The flame-resistant fiber 8 and the organic fiber 10 may be mixed and locked together by carding or the like to form a lap. It is possible to make a desired felt precursor out of the lap. The felt precursor is manufactured by needle-punching minutely from one or both sides of the lap to orient the fiber 10 in the direction of a thickness by this needle-punching, as shown in FIG. 2. If the needle-punching is only carried out from one side of the lap, the punched surface is positioned on the side of the solid electrolyte tube, as for the electric conductor. If the needle-punching is also carried out from both sides of the lap, the one surface of the felt are different in the number of needle-punching times to the other surface and the more minutely punched surface is positioned on the side of the solid electrolyte tube, as for the electric conductor.

It is preferable that the felt precursor 2 is defined over a degree of fiber orientation of 30% in the direction of a thickness by minutely needle-punching and a density thereof is between 0.120 and 0.155 g/cm$^3$. When the degree of fiber orientation is more than 30%, the problem of blocking tends to occur in sodium-sulfur cell and it is difficult to reduce the internal resistance of the cell. The thickness of the felt precursor 2 may be generally about 120 to 145% of the established electrode thickness. A felt having about 17 mm in thickness falls off about 2 mm by baking.

The electric conductor 1 is obtained by baking or carbonizing the felt precursor 2 at 1100 to 2000° C. When the felt precursor 2 is baked at 1100 to 2000° C., the organic fiber in the felt is incinerated to transpire almost solid thereof so that the felt is voided of the organic fiber 10 and the felt density lowers. The conductor 1 is decreased to a felt density of 0.065 to 0.107 g/cm³, preferably 0.077 to 0.100 g/cm³ by space opening of the organic fiber parts.

On the occasion of applying to the sodium-sulfur cell 3 (FIG. 3), the electric conductor 1 may be cut suitably, curved cylindrically and arranged between the outer surface of the solid electrolyte tube 6 and the inner surface of the anodic container 5. The conductor 1 has a necessary electroconductive by baking after minute needle-punching even if the felt precursor 2 is electrically a nonconductor. Also, necessary high heat-resistance arises in the conductor 1 by baking even if the flame-resistant fiber 8 in the felt precursor 2 has only heat-resisting property of 300° C. or so.

Effect of the Invention

An electric conductor for electrodes obtained by a method of the present invention has lower felt density and larger number and volume of pores than that of a standard carbon fiber. When the conductor of the present invention is therefore applied to a secondary or fuel cell or the like, such as a sodium-sulfur cell or battery, it can be impregnated with larger amount of cathodic reactant such as molten sulphur and improves remarkably generating efficiency of the cell. The conductor of the present invention has a great number of pores between each fibers and high degrees of fiber orientation, and consequently the problem of blocking decreases and internal resistance of sodium-sulfur cell or the like falls further down as compared with a standard carbon fiber felt, in a case that it is used for a secondary battery.

In a felt precursor of the present invention, usage of a comparatively expensive flame-resistant fiber is few so that a reduction in expenses for the electric conductor can be achieved, even if the conductor has the given thickness and density. Since the felt precursor contains an organic fiber that incinerates while baking, and thus it rises in baking efficiency to the electric conductor, considerable reduction in costs is achieved in this respect.

EXPLANATIONS OF NUMERALS

Figure 1:
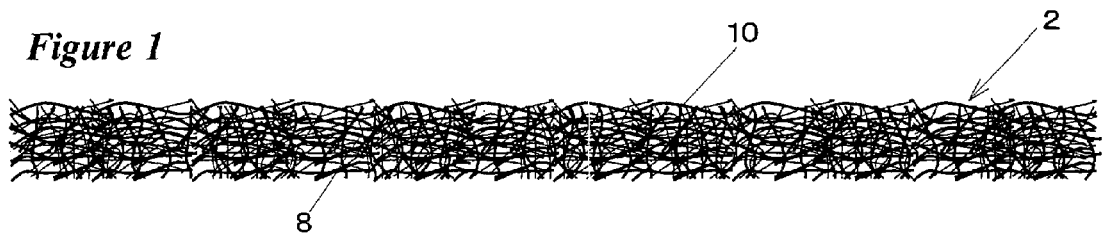
FIG. 1 is an enlarged sectional view showing schematically a felt precursor according to the present invention.
Figure 2:
FIG. 2 is an enlarged sectional view showing schematically an electric conductor prepared by a method of the present invention.
Figure 3:
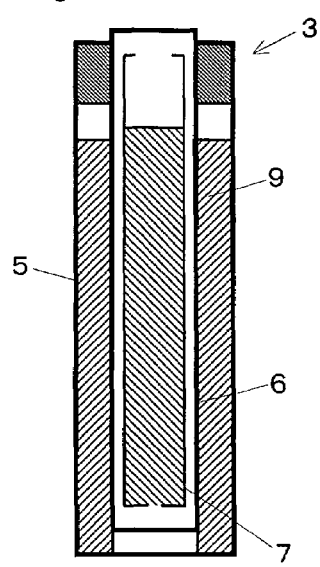
FIG. 3 is a schematic sectional view showing a sodium-sulfur cell for an electric power storage system exemplifying application of the electric conductor.

1 Electric conductor for electrodes
2 Felt precursor
3 Sodium-sulfur cell
5 Anodic container
8 Flame-resistant fiber
10 Organic fiber

EXAMPLE 1

The present invention is now illustrated on the basis of examples, but the present invention will not be limited to the examples. So as to prepare an electric conductor 1, there was used a flame-resistant PAN fiber 8, for example, "PYROMEX" made by Toho Tenax in Japan, on which an acryl fiber was baked at 200 to 300° C. in active atmosphere such as air. The flame-resistant PAN fiber 8 has a fineness of 2.2 dtex and 51 mm in length.

With this flame-resistant PAN fiber 8, there was mixed 10% in weight of polypropylene staple having a fineness of 11 dtex and 32 mm in length to form a lap by carding with a well-known carder. Suitable number of the lap thus obtained was layered and then a felt precursor 2 was prepared by needle-punching from one side thereof. The felt precursor 2 has a density of 0.148 g/cm³ and a degree of fiber orientation of 38%.

The felt precursor 2 was also baked at about 1600° C. to carbonize the flame-resistant PAN fiber 8 and incinerate the polypropylene staple. As this result, solid of the polypropylene staple was almost transpired and thereby the felt 2 was voided of the staple to yield a felt-type conductor 1. A density of the electric conductor 1 was diminished to 0.095 g/cm³. In the conductor 1, the felt density thereof lowered and pores thereof increased as compared with a normal felt made of a carbon fiber. When the conductor 1 was applied to sodium-sulfur cell, it held much melted sulfur and generating efficiency of sodium-sulfur cell was improved.

EXAMPLE 2

With the flame-resistant PAN fiber 8 applied in Example 1, there was mixed 10% in weight of polypropylene staple having a fineness of 7.7 dtex and 32 mm in length to form a lap by carding with a well-known carder. Suitable number of the lap thus obtained was layered and then a felt precursor 2 was prepared by needle-punching from one side thereof. The felt precursor 2 has a density of 0.148 g/cm³ and a degree of fiber orientation of 38%.

The felt precursor 2 was also baked at about 1600° C. to carbonize the flame-resistant PAN fiber 8 and incinerate the polypropylene staple. As this result, solid of the polypropylene staple was almost transpired and thereby the felt 2 was voided of the staple to yield a felt-type conductor 1 for electrodes. A density of the electric conductor 1 was diminished to 0.099 g/cm³. In the conductor 1, the felt density thereof lowered and pores thereof increased as compared with a normal felt made of a carbon fiber. When the conductor 1 was applied to sodium-sulfur cell, it held much melted sulfur and generating efficiency of sodium-sulfur cell was improved.

EXAMPLE 3

With the flame-resistant PAN fiber 8 applied in Example 1, there was mixed 5% in weight of polypropylene staple having a fineness of 4.4 dtex and 30 mm in length. By the same treatment as Example 1, there was prepared a felt precursor 2 having a density of 0.154 g/cm³ and a degree of fiber orientation of 33%.

The felt precursor 2 was baked to carbonize the flame-resistant PAN fiber 8 and incinerate the polypropylene staple. As this result, solid of the polypropylene staple was almost transpired and thereby the felt 2 was voided of the staple to yield a felt-type conductor 1. A density of the electric conductor 1 was 0.101 g/cm³. In the conductor 1, the felt density thereof lowered and pores thereof increased as compared with a normal felt made of a carbon fiber. When the conductor 1 was applied to sodium-sulfur cell, it held much melted sulfur and generating efficiency of sodium-sulfur cell was improved.

EXAMPLE 4

With the flame-resistant PAN fiber 8 applied in Example 1, there was mixed 5% in weight of polyester fiber having a fineness of 6.6 dtex and 38 mm in length, instead of polypropylene staple. By the same treatment as Example 1, there was prepared a felt precursor 2 having a density of 0.142 g/cm$^3$ and a degree of fiber orientation of 31%.

The felt precursor 2 was baked to carbonize the flame-resistant PAN fiber 8 and incinerate the polyester fiber. As this result, solid of the polyester fiber was almost transpired and thereby the felt 2 was voided of the polyester fiber to yield a felt-type conductor 1 for electrodes. A density of the electric conductor 1 was 0.095 g/cm$^3$. In the conductor 1, the felt density thereof lowered and pores thereof increased as compared with a normal felt made of a carbon fiber. When the conductor 1 was applied to sodium-sulfur cell, it held much melted sulfur and generating efficiency of sodium-sulfur cell was improved.

COMPARISON 1

So as to a felt precursor, there was employed the same flame-resistant PAN fiber as in Example 1 to form a lap containing 100% of the flame-resistant PAN fiber. The lap was treated as same as Example 1 except greater number of needle-punching times to yield a felt precursor having a density of 0.173 g/cm$^3$ and a degree of fiber orientation of 42%.

The felt precursor was carbonized by baking to yield a felt-type conductor for electrodes. A density of the obtained conductor was 0.115 g/cm$^3$. In this conductor, the felt density thereof lowered a little but there were not many pores as compared with a normal felt made of a carbon fiber. When this conductor was applied to sodium-sulfur cell, the impregnation volume of melted sulfur was the same as a conventional cell and generating efficiency of sodium-sulfur cell was hardly ever improved.

COMPARISON 2

So as to a felt precursor, there was employed the same flame-resistant PAN fiber as in Example 1 to form a lap containing 100% of the flame-resistant PAN fiber. The lap was treated as same as Example 1 except smaller number of needle-punching times to yield a felt precursor having a density of 0.115 g/cm$^3$ and a degree of fiber orientation of 23%.

The felt precursor was carbonized by baking to obtain a felt-type conductor for electrodes. A density of the obtained conductor was 0.110 g/cm$^3$. In this conductor, the felt density thereof lowered a little but there were not many pores as compared with a normal felt of a carbon fiber. When this conductor 1 was applied to sodium-sulfur cell, the impregnation volume of melted sulfur was the same as a conventional cell and generating efficiency of sodium-sulfur cell was hardly ever improved.

COMPARISON 3

So as to a felt precursor, 10% in weight of polypropylene staple having a fineness of 7.7 dtex and 72 mm in length was mixed with the same flame-resistant PAN fiber as in Example 1. The lap was then treated as same as Example 1 except smaller number of needle-punching times to yield a felt precursor having a density of 0.145 g/cm$^3$ and a degree of fiber orientation of 13%.

The felt precursor was carbonized by baking to obtain a felt-type conductor for electrodes. A density of the obtained conductor was 0.100 g/cm$^3$. This conductor settled down by locking together the fibers too much because of the longer polypropylene fiber. Accordingly, it is a little insufficient to diminish the felt density about this conductor. When this conductor was applied to sodium-sulfur cell, the impregnation volume of melted sulfur was the same as a conventional cell and generating efficiency of sodium-sulfur cell was not improved.

What is claimed is:

1. A method for manufacturing an electric conductor for electrodes having low density, which comprises:
    forming a lap by mixing and locking together relatively large amount of a flame-resistance fiber and relatively small amount of an organic fiber;
    orienting fibers of the layered lap in the direction of a thickness by needle-punching to felt the layered lap; and
    baking the felt thus obtained at 1100 to 2000° C. whereby the flame-resistant fiber is carbonized and the organic fiber is so incinerated that solid of the organic fiber is almost transpired, the felt is voided of the organic fiber and the felt density lowers.

2. The method as recited in claim 1, wherein the flame-resistant fiber is a PAN fiber and the organic fiber is selected from the group consisting of a polyolefin, polyamide and polyester fiber.

3. The method as recited in claim 1, wherein the organic fiber is a polypropylene fiber having a fineness of 3 to 22 dtex.

4. The method as recited in claim 3, wherein the polypropylene fiber has a fineness of 6 to 15 dtex.

5. The method as recited in claim 1 wherein the length of the organic fiber is between 5 mm and that of the flame-resistant fiber.

6. The method as recited in claim 1, wherein a felt density of the electric conductor is 0.077 to 0.100 g/cm$^3$.

7. A method for manufacturing a low-density conductor for electrodes with a felt density of 0.065 to 0.107 g/cm$^3$ and an electric resistance of 1 to 500 mΩ, which comprises:
    forming a lap by mixing and locking 70 to 98% in weight of a flame-resistant fiber and 2 to 30% in weight of an organic fiber,
    orienting fibers of the layered lap in the direction of a thickness by needle-punching minutely from one or both sides thereof to obtain a felt precursor having a density of 0.120 to 0.155 g/cm$^3$ and a degree of fiber orientation of 30% or more in the direction of a thickness, and
    baking the felt precursor.

* * * * *